J. P. Woodbury.

Locomotive Engine.

N° 112,001. Patented Feb. 21, 1871.

Witnesses:
A. Van Berry
Frank G. Parker

Inventor:
Joseph P. Woodbury

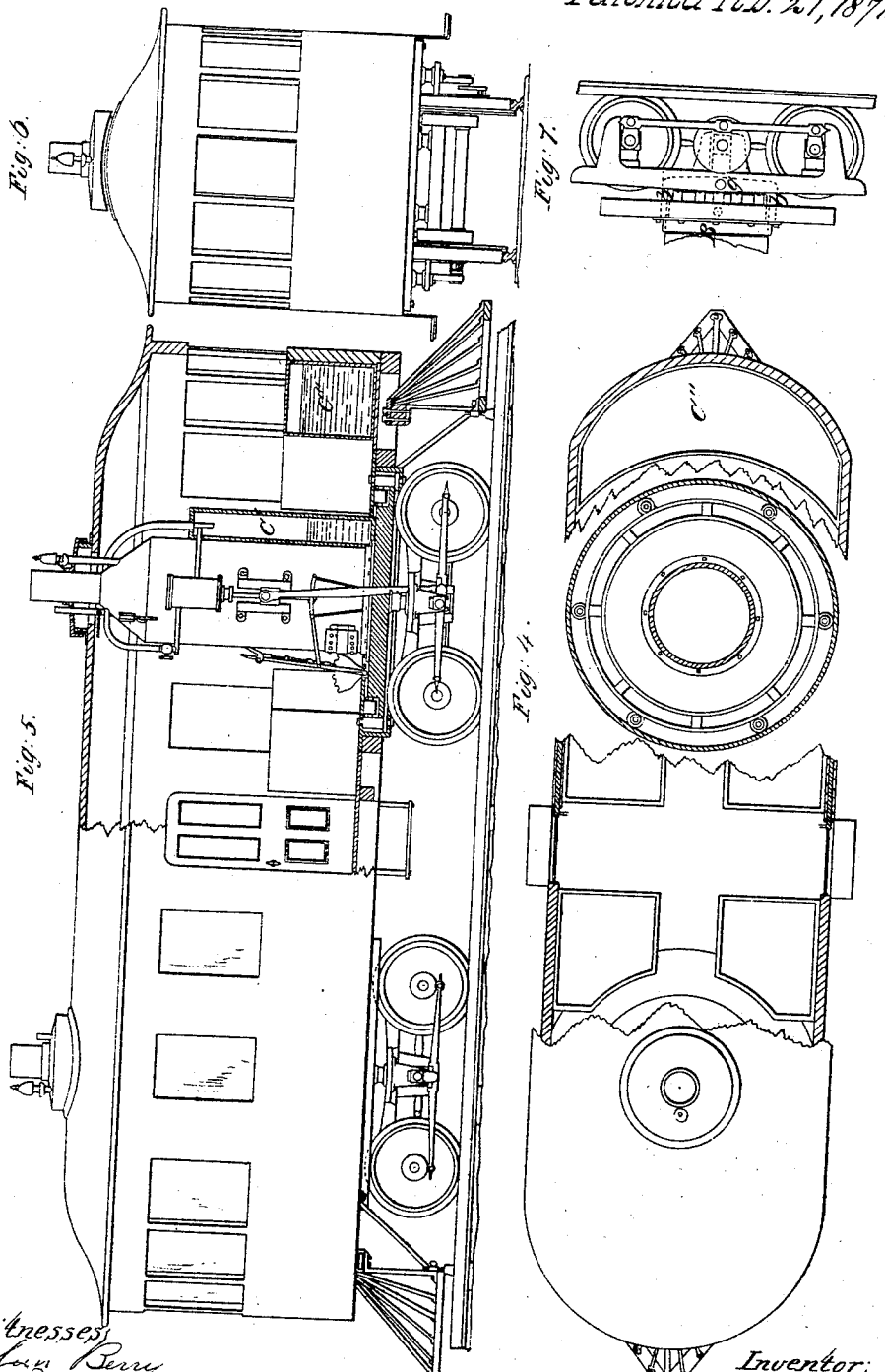

UNITED STATES PATENT OFFICE.

JOSEPH P. WOODBURY, OF WEST ROXBURY, MASSACHUSETTS.

IMPROVEMENT IN CONDENSING DOUBLE-END LOCOMOTIVE-ENGINES.

Specification forming part of Letters Patent No. 112,001, dated February 21, 1871; antedated February 6, 1871.

*To all whom it may concern:*

Be it known that I, JOSEPH P. WOODBURY, of West Roxbury, in the county of Norfolk and State of Massachusetts, have invented certain new and useful Improvements in Condensing Double-End Locomotive-Engines; and I do hereby declare that the following is a full and exact description thereof, reference being had to the accompanying drawings, and to the letters of reference marked thereon.

The nature of my invention consists in a new and original arrangement of hot-water tanks and condenser; also, in the arrangement of the connecting-pipes, and in devices for operating the link-motion and throttle-valves, together with new combination of parts, the object of the invention being to make a locomotive-engine especially adapted to street work, its characteristics being that it will run equally well either way, it will traverse curves of short radii, condenses its steam, and, though having two engines, it is under instantaneous control of the engineer, who may be located at either end or in the center of the engine.

As my invention is quite complicated, no definite understanding of its nature can be had except by careful study of the specification and drawings.

Drawings.

Figure 2:
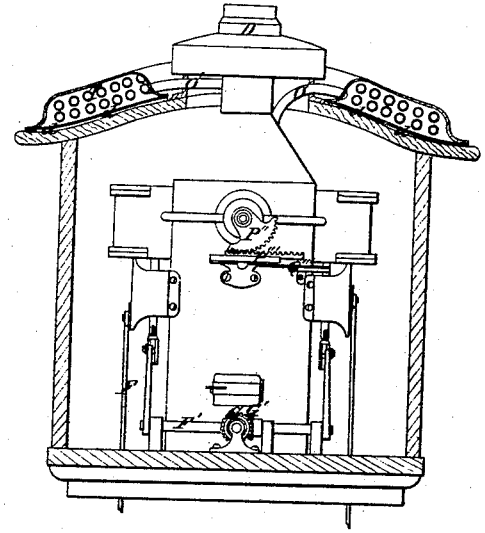
Figure 3:
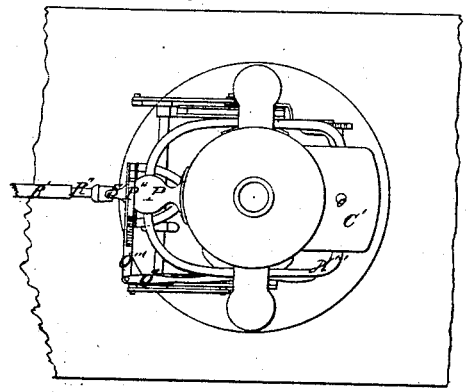
Figure 1:
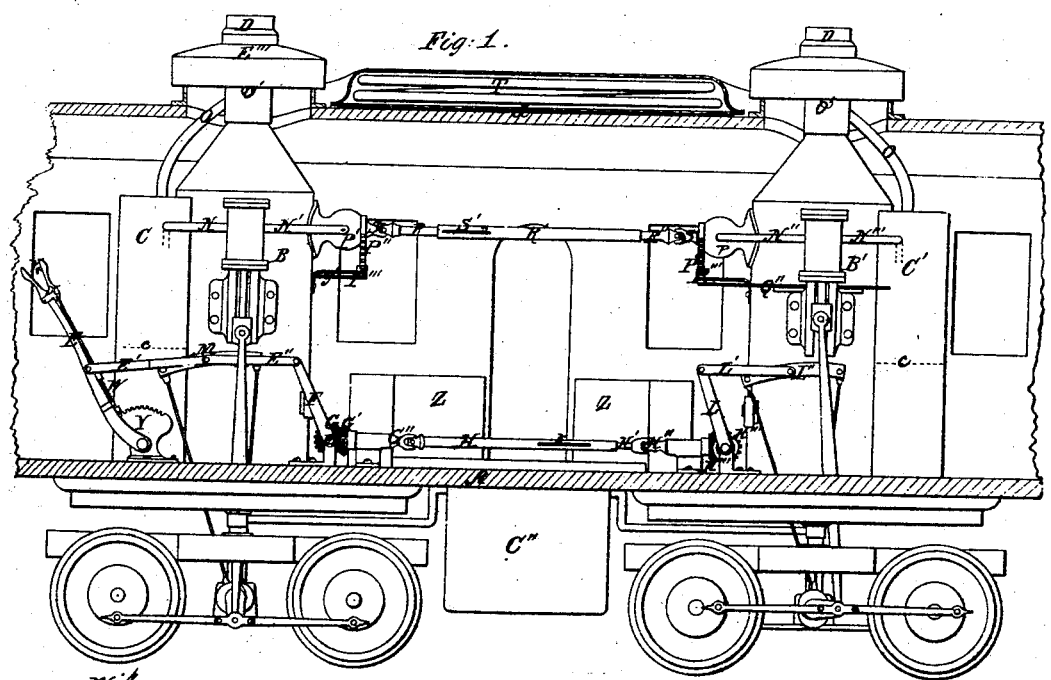

Figure 1 is a representation of my improved engine, in which the trucks and engines and connecting-gear are shown in elevation, while the covering or cab and condenser are shown in section. Fig. 2 is an end representation of the same. Fig. 3 is a plan of one of the engines. Fig. 4 represents, partly in plan and partly in horizontal section, the leading features of my engine, minor details being omitted. Fig. 5 represents the same partly in elevation and partly in section. Fig. 6 is an end view of my car. Fig. 7 is an elevation of the truck and the lower end of the boiler, showing the water-legs b b and ash-pit g extending below the platform.

A forms the base or platform of my locomotive.

The several parts of my trucks, cylinders, piston-rods, and their adjuncts are made, arranged, and combined as I have already described in the specification of patent for "locomotive truck and engine" granted to me May 14, 1867, and numbered 64,821, and therefore need not be particularly described now.

I will first describe my arrangement of water-tanks and condenser.

C'', Fig. 1, represents a cold-water tank to supply the boilers. This may be located under the platform of the locomotive, as represented in Fig. 1, or within the cab, if desirable, as shown at C'', Figs. 4 and 5, Sheet No. 2.

C and C' are two hot-water tanks, one of which, C', is shown in plan on Fig. 3 and in section on Fig. 5, and which are intended to be but partly filled with water, as indicated by the dotted lines c, so that the exhaust-steam, as it comes from the cylinder throu the pipe N''', being impelled directly downward against the surface of the water, will be more or less condensed.

That portion of the steam which is not condensed in the tank C' passes through O into the pipes T, Figs. 1 and 2, and thence, through the pipe O', into the smoke-stack, whence it will emerge into the open air with so little force that it will neither be scarcely perceptible to the eye or ear.

The series of condensing-pipes T, Figs. 1 and 2, is represented in the drawings as being inclosed within a water-tank, said tank having an air-space, d d, Fig. 2, between it and the top of the car, though inclosing the condensing-pipes T within a water-tank will be often desirable.

I propose to have the pipes T in, perhaps, a majority of cases exposed directly to the air, since, being located at the top of the car, the heated air flowing from them will cause no inconvenience to the occupants of the cab.

Instead of a series of pipes, corrugated tanks may be substituted.

The condensing-pipes may be arranged longitudinally or transversely, as may seem most desirable; and when the pipes are used as air-condensers, they should be left exposed, so that the air can have free access to them, flowing about them with a velocity equal to that with which the engine travels. Thus the greater the speed of the engine the greater the amount of steam condensed, the hot air constantly flowing to the rear and upward, and being supplied by fresh cool air from the front.

The condenser should have sufficient surface to effectually condense the steam under all variations of temperature and of climate; and there is an abundance of room on the top of a cab or car for the purpose.

Return-pipes may lead from the condensing-pipes to the hot or cold water tanks, to take back the water of condensation.

The above-described arrangement of hot and cold water tanks, condensers, and pipes is equally adapted to all locomotive-engines and locomotive-cars for streets or other purposes, making no puffing noise or visible escape from the exhaust-steam.

The pipes leading to and from the condenser may be made with socket-joints or may be of elastic material.

As a safeguard against the action of heat on the wood-work of the cab, I line or cover the cab with sheet metal. Between the wood and the metal lining I interpose felting or some other non-conducting substance.

In street-locomotives intended to run either way without turning, in which there are two engines working on oscillating platforms, it is quite essential that the engineer in charge should have both engines under immediate control, and also that he should be at that end of the cab which for the time being is the front. I have, therefore, invented a series of devices by the aid of which the engineer, being at either end of the cab, may operate the reverse-links and throttles of both engines at the same instant.

My device for operating both reverse-links M and L'', Fig. 1, is as follows: I connect to the reverse handle E a link, E', which is connected by a pivot to the reverse-link M and to a second link, E'', which, in its turn, is pivoted to the crank F of the shaft F'. The shaft F', acting through the bevel-gears G G', actuates the shaft G''. H is a hollow shaft, either round or prismatic, connected to G'' by a universal joint. H' is a shaft sliding freely within H, but so connected to it, by means of the pin K, working in a slot, as shown, that the two—namely, H and H'—must revolve together. H'' is a shaft operated by H', and having a bevel-gear, H''', which, operating through a bevel-gear, H'''', crank L, and link L', operates the reverse-link L''.

From the above description it will be seen that any motion given to the reverse-link M of one engine will be transmitted, through the several levers, gears, and rods, to the reverse-link L'' of the other engine.

The catch W, Fig. 1, is operated by the lever X, and may be hooked up by the hook V, and so retained while the engineer is at the opposite engine.

The utility or necessity of the compound or telescopic rod H H' and the universal joint at its ends will be readily comprehended if we bear in mind the fact that the two shafts G'' H'' are attached to two independent oscillating platforms, so that the relative position of G'' and H'' is constantly varying whenever the car is passing around a curve or over any irregularities of the track. For a similar reason the two throttle-valves in the throttle-globes P P', Fig. 1, are connected by a telescopic rod, R R' R''.

I will now describe the device for operating this.

Q' and Q'', Fig. 1, are two levers, one of which, Q'', is shown on plan, Fig. 3. These levers swing on a pivot located near the piston-rod. (Not shown in the drawings.) Attached to the end of each of these levers is a ratchet, P''', Figs. 1 and 2, the teeth of which operate a segment-gear, P'', Fig. 2. The segment-gear being attached to the stem S of the throttle-valve, any movement of the lever Q' will cause a corresponding movement of the ratchet P''' and the segment-gear P'', and thus operate the throttle-valve; and, since the stems S S of the throttle-valves are connected by the telescopic rod R R' R'', they both work together and are both operated by the movement of either of the levers Q' or Q''.

In cases where it is necessary to use my locomotive-engine on long streets that are not often crossed by other streets, it will be found the most convenient to have the locomotive-engine made as shown in Figs. 4, 5, 6, and 7, so that the engineer can be in the middle of the cab, between the engines, with the fireman.

In case the street-railway is crossed frequently by other streets, it is very necessary that the engineer be at the extreme forward end of his cab, so that he can see all of the cross-streets as he approaches them, and be ready to prevent accidents. To provide for this I build the car as shown in Figs. 1, 2, and 3.

I propose to fix a metallic apron entirely around the outside of the locomotive-cab, extending from the sill of the cab to within five or six inches of the rail, so as to hide the machinery from view, and also to prevent men and animals from getting under the wheels. At each end of the locomotive-engine this metallic apron should be shaped something like a plow, so as to push all obstacles out of the way of the locomotive.

The telescopic rods and universal joints herein described are equally applicable to my locomotive truck and engine, a patent for which was granted me May 14, 1867.

What I claim as my invention, and desire to secure by Letters Patent of the United States, is—

1. The crescent-shaped hot-water tank, in combination with the pipes O O' and condenser T, arranged substantially as and for the purpose set forth.

2. The combination of the throttle-valves S S, the rods R R'', and tube R, substantially as described, and for the purpose set forth.

3. The combination of the reverse-links L''

M with the actuating device H H¹ H² H³ H⁴, L L', G'' G' G, F E'', substantially as described.

4. The segment-gear P'', in combination with the throttle-valve stem S and the ratchet P''', substantially as described, and for the purpose set forth.

5. The telescopic rod H, in combination with the beveled gears G G' and rocker-shaft F', substantially as described, and for the purpose set forth.

JOSEPH P. WOODBURY.

Witnesses:
A. HUN BERRY,
FRANK G. PARKER.